June 30, 1953  A. J. WOHLGEMUTH  2,643,753
ELECTRIC TYPEWRITER
Filed April 29, 1950  2 Sheets-Sheet 2

| Selector Bars | CHARACTERS | | | | | | | | | |
|---|---|---|---|---|---|---|---|---|---|---|
| | A | B | C | D | E | F | G | R | T | Y |
| 1 | X | X | O | X | X | X | O | O | X | X |
| 2 | X | O | X | O | O | O | X | X | O | O |
| 3 | O | O | X | O | O | X | O | O | O | X |
| 4 | O | X | X | X | O | X | X | X | O | O |
| 5 | O | X | O | O | O | O | X | O | O | X |
| 6 | O | X | O | X | O | O | O | X | X | O |

X — Marking (Right)   FIGURE 4
O — Spacing (Left)

INVENTOR.
Adolph J. Wohlgemuth

Patented June 30, 1953

2,643,753

UNITED STATES PATENT OFFICE 2,643,753

ELECTRIC TYPEWRITER

Adolph J. Wohlgemuth, Westfield, N. J.

Application April 29, 1950, Serial No. 158,988

12 Claims. (Cl. 197—18)

Among the earliest of the typewriters was one using a type-wheel or type-sector. In the development that followed, the ones that were commercially more successful were the type-arm machines with each letter on a single pallet. These were copied and improved until they were brought to a high state of development, to the point that the type-wheel machine was neglected and is now far behind the others, both in development and acceptance.

The principal reason for its discard was the physical effort required to turn the type-wheel to the desired position, causing slow operation and fatigue of the operator. At that time, electric motors, too, had not yet been brought to the present stage of development where considerable power is available in small space.

The present invention proposes to combine the advantages of simplicity, ease of construction and adjustment, and the cheapness of the type-wheel typewriter with the power available from a compact electric motor to provide a simple, easily-operated typewriter than can be mass-produced inexpensively. It will embody all the advantages of an electric typewriter: uniformity of impression, ease and adjustability of operation, power to make a large number of copies without undue effort on the part of the operator and speed combined with the advantages of a type-wheel typewriter, simplicity, ease of changing characters, elimination of alignment problems and low cost.

The principle of this invention is the use of permutation rings, so arranged that when a particular letter is selected, they arrange themselves so that one, and only one of a plurality of identical rods goes into a position that halts the rotation of the type-wheel at the required position for imprinting. This principle and other features of the invention are illustrated in the accompanying drawings, in which:

Figure 4 is a portion of one of the possible codes that can be used in designing the selector bars and permutation rings.

Selector mechanism

Figure 1:
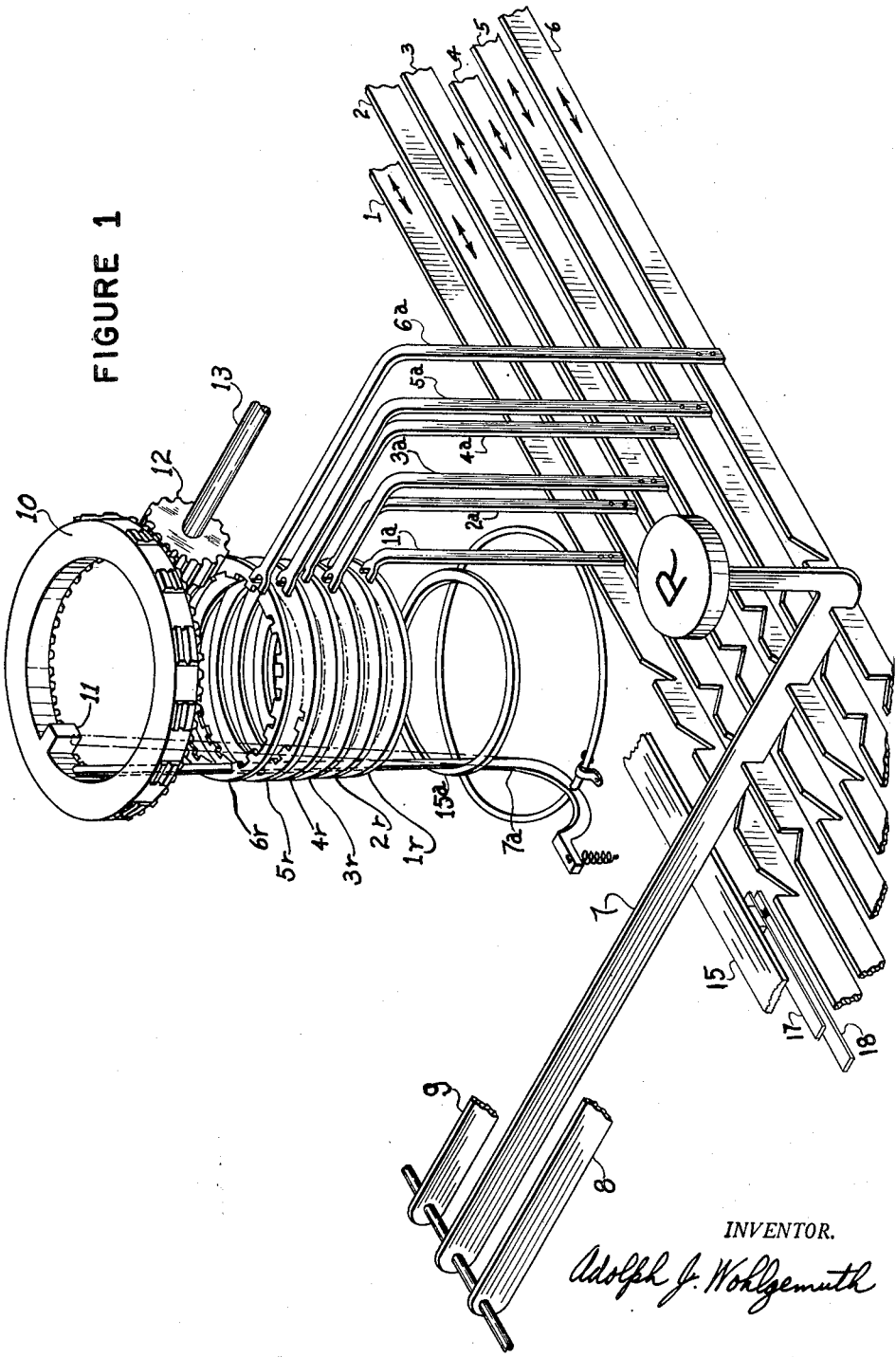
Figure 1 is a diagrammatical perspective view of the principle of the invention as a whole.

Referring to Figure 1, key lever 7 is the key on the typewriter for the letter "R." As the lever is depressed, it goes into notches on the six selector bars 1, 2, 3, 4, 5, and 6 positioning them as shown. On the left of lever 7 is lever 8, which shows the notches more clearly. It can be seen that the bars, which are free to move right or left laterally, will be shifted depending on the previous position and the direction of the notches under the key lever that is depressed. With the lever 7 depressed as shown, the selector bars are moved: 1—left, 2—right, 3—left, 4—right, 5—left, and 6—right. If lever 8 is next depressed selector bar 1 will move to the right, 2—left, 3—right, 4 will not move but remain right, 5 will not move but remain left, and 6 will move to the left. From this illustration it can be seen that each key lever can position the selector bars according to its particular code.

Figure 4 illustrates a portion of a suggested code. Using six selector bars permits $2^6$ or 64 combinations since each selector bar can only go into either of two positions. In printing telegraph nomenclature, one is the marking position and the other the spacing. Here right is called marking, and left spacing; the terms being assigned arbirtarily. Marking and spacing positions determine the direction of the sloping portion of the notch. When the inclined portion of the notch is downward to the right, and the selector bar is at the right or marking position, a key lever in going down will push the selector bar to the left in going down the inclined surface. Since the selector bars are free to move laterally, it will be pushed to the left to the spacing position. In that way, by sloping the notches the selector bars can be caused to take marking or spacing positions determined by the notching of the bars and the particular letter being depressed.

Translating mechanism

Returning to Figure 1, with the selector bars positioned for a particular letter, the connecting rods 1a, 2a, 3a, 4a, 5a, 6a are positioned right or left. These, in turn, position the permutation rings 1r, 2r, 3r, 4r, 5r, 6r to a corresponding position. The rings are guided so that they are free to turn through a small arc of a circle, clockwise for spacing; counterclockwise for marking.

Figure 2:
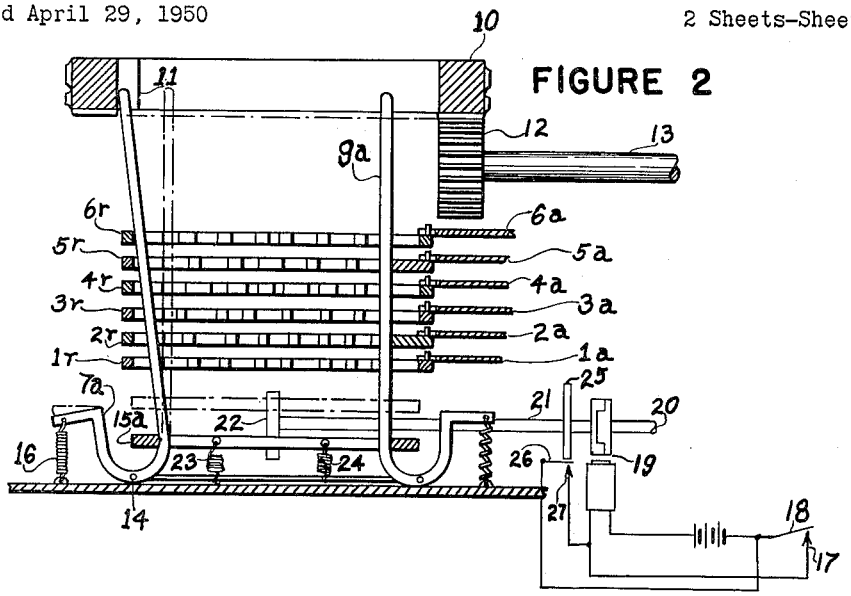
Figure 2 is a cross section of the permutation rings and the type-wheel.
Figure 3:
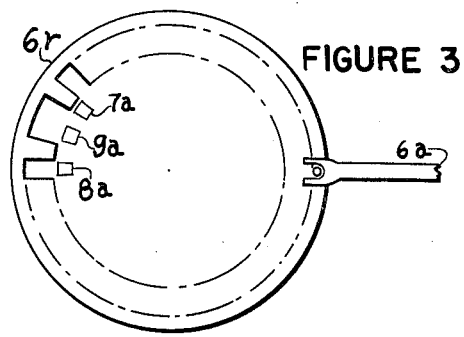
Figure 3 is a top view of one of the permutation rings.

The way the permutation rings select a particular letter is shown in Figures 2 and 3. Figure 3 shows ring 6r in the spacing position with the tops of the character rods 7a for the letter "R," 9a for "G," and 8a for "F." Referring to the code, and since the ring is shown in the spacing position, 7a is in front of a projection, while 8a and 9a are in front of indentations in the disc. When the ring is rotated clockwise, to the marking position, 7a is then in front of an indentation and 8a and 9a are in front of projections on the ring.

Corresponding to each lever, as the lever 7, is a character rod 7a. In Figure 2 the operation of the permutation rings 1r, 2r, 3r, 4r, 5r, and 6r in relation to the character rods, such as 7a, is shown. With the permutation rings positioned by the lever 7 and the selector bars with their associated connecting rods, the indentations on the rings will line up and permit the character rod 7a to take the position shown in the solid lines on the left side of Figure 2. Character rod 9a is held in the vertical position by the projection on the permutation ring 5r.

The typewheel 10 is turned by the gear 12 which is driven by shaft 13 which in turn is connected to an electric motor by means of a friction clutch not shown. When the rod 7a goes into the position shown in the solid lines, the rotation of the typewheel 10 is stopped by the projection 11 and the clutch permits the motor to turn without turning the shaft 13. Thus the typewheel is stopped at a particular position depending on the letter selected. After the typewheel has been stopped, the paper can be pressed against the letter through an inked ribbon—a method of imprinting often used in typewheel typewriters. An alternative method of imprinting would be to hold the position of the typewheel and carry it to the platen of the typewriter causing it to strike the paper through an inked ribbon, using conventional typewriter platen mechanisms. The methods of imprinting are well-known and do not constitute a part of this invention.

Release ring mechanism

To permit character selection and yet hold the typewheel in position while imprinting, the release ring mechanism is necessary. Referring again to Figure 1, when the key lever is pressed down, the selector bars are moved right or left according to the code. Positioned close to the bottom of the notches is the release bar 15, so that it need only move a short distance vertically, a few thousandths of an inch, to close the electrical contacts 17 and 18, the selector bars having already been entirely positioned. This closes the circuit of the magnetic clutch for a cam which operates the release ring as shown in Figure 2.

Figure 5:
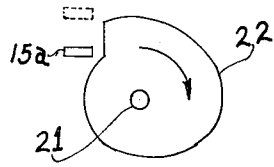
Figure 5 is an enlarged front view of the cam required to raise the release ring.

In Figure 2, when the circuit is closed, the magnetic clutch 19 couples the shaft 20, which is driven by the electric motor, to the shaft 21 on which is mounted the cam 22 and the cam 25. Cam 25 keeps the magnetic circuit energized through the contacts 26 and 27, while the release ring operates. The cam 22 turns allowing the release ring 15a to be pulled to the lower solid position by the springs 23 and 24. The spring 16 pulls the rod 7a against the permutation rings acting through the pivot 14. This happens on all the rods, as the release ring 15a goes down, but only the selected rod can go all the way back, the others being stopped by one or more of the projections, as seen in Figures 2 and 3. A typical cam for moving the release ring is shown in Figure 5.

The method that is shown here of operating the release mechanism is electrical. However, an entirely mechanical method could be constructed by anyone skilled in the art. The important consideration is that the selection is first made, then while held in that position the typewheel is brought to its corresponding position before a new selection can be set up, but after the letter has been imprinted, the entire mechanism is free to start the cycle over.

The mechanisms shown in the drawings illustrate the invention but are not intended to limit it to the mechanisms shown.

What is claimed is:

1. A typewheel typewriter comprising an electric motor, a driving shaft, a friction clutch connecting said shaft to said motor, a typewheel driven by the driving shaft and having a stop thereon, a set of rings having their inner edges notched according to a predetermined code, a plurality of identical rods mounted to engage the inner edges of said notched rings, a set of letter keys, levers operated by the letter keys for positioning the notched rings to allow one of said rods to move into a position to engage the stop on said typewheel, and a ring for holding the rods away from the notches while said rings are being positioned.

2. An electric typewriter comprising an electric motor, a driving shaft, a friction clutch connecting said shaft to said motor, a typewheel rotated by said shaft, a set of character keys, bars positioned laterally by the character keys according to a predetermined code, permutation rings notched according to said predetermined code, means to translate the lateral positions of said bars into rotary positions of said permutation rings, a plurality of rods arranged concentrically within said permutation rings, and means for moving said rods against said rings permitting one and only one of said rods to move radially away from the axis of rotation of the typewheel, said typewheel rotating coaxially with the permutation rings and having a stop engageable with the radially moved one of said rods to arrest the rotation of the typewheel.

3. In an electric typewriter, a rotating typewheel, an electric motor and a friction clutch for driving said typewheel, rods arranged with the greatest part of their length parallel to the axis of rotation of the typewheel, said rods being severally placed concentrically with said typewheel, spring controlled means for pulling them radially from the center of rotation of said typewheel, a ring restraining said rods from so moving, a plurality of rings concentric with the axis of rotation and internally notched according to a predetermined code, the notches so arranged that one and only one rod will be moved by said spring controlled means when said rings are positioned according to said predetermined code, and a projection on the inner periphery of said typewheel that comes into contact with said rod.

4. An electrical typewriter, comprising a series of manually operable type selecting levers, a rotative type carrier, a plurality of notched rings disposed in concentric relation to the type carrier, a plurality of parallel bars having notches formed with sides sloping in opposite directions and disposed under the type selecting levers and shiftable in either direction thereby, a plurality of arms carried by said bars and having connection with the notched rings to turn the same, and a plurality of arms extending through the notched rings, to limit the rotative movement of the type carrier, said type carrier having a limit stop to engage one of said arms.

5. An electrical typewriter, comprising a typewheel supported for rotation in a horizontal plane, said wheel having an internal stop, a plurality of arms extending through the typewheel to have selective engagement with said internal stop, a plurality of internally notched rings enclosing said arms, a plurality of horizontally movable bars disposed in parallel relation to each other, said bars having notches formed in the upper longitudinal edges thereof, said notches being disposed to provide oppositely sloping propelling surfaces, a series of manually operable printing selective levers supported over the horizontal bars to engage the notches thereof, means carried by the horizontal bars for producing a limited turning of the notched rings, the number of notched rings being equal to the number of notched horizontal bars, and means for operating the arms.

6. An electrical typing mechanism, comprising a type printing wheel having an internal stop, a motor shaft having driving engagement with the wheel, a plurality of movable arms pivoted to swing into position to engage the stop, a cam actuated member for releasing the arms, a series of internally notched rings concentric to the wheel, an arm having pivotal engagement with each notched ring, a horizontal bar having driving connection with each of said last named arms and provided with oppositely inclined surfaces, and a series of character selective manually movable levers disposed over the horizontal bars to simultaneously engage adjacent inclined surfaces of a plurality of said bars.

7. An electrical typing mechanism, comprising a curved surfaced type printing member mounted to turn around a center, a series of internally notched rings disposed in concentric relation to the member, said member having a stop thereon, an arm having pivotal connection with each ring to produce a limited turning effort thereof, a horizontal bar having connection with each arm and provided with oppositely inclined propelling surfaces, a series of selective stop arms pivoted within the rings and member, the rings having notches so arranged that only one of the selective stop arms may engage at one time the stop of the member, manual selective character levers disposed to have operative engagement with said bars, a motor shaft having a cam, and means operable by said cam for releasing any selective stop arm from engagement with the stop of the member.

8. A typing mechanism, comprising a printing member having a circular surface carrying different type faces, a motor driven shaft for turning the member to move any type face to printing position, said printing member having a stop, an arm pivoted to engage the stop, a cam operated release for said arm, a series of notched members enclosing the arm, a horizontal bar having driving connection with each notched member and provided with oppositely inclined propelling surfaces, and a series of manual character selecting levers mounted over the bars to produce selective propelling action thereof.

9. A typing mechanism, comprising a printing wheel having a series of external faces thereon, a motor shaft having driving connection with the printing wheel, said printing wheel having an internal stop, a series of permutation rings disposed in concentric relation to the printing wheel and having code controlling internal notches, a series of selective stop arms pivoted to swing within the printing wheel and the rings outwardly to engage the rings and the internal stop, a sliding bar for each ring, an arm carried by each bar having driving connection with each ring, a motor shaft having circuit controlling connections and provided with a cam, and a ring engaged by the cam to release the stop arms.

10. A typing mechanism having a printing wheel, a motor driven shaft for turning the wheel, a series of manually operated character selecting levers, a series of sliding bars disposed crosswise of the levers and provided with oppositely inclined surfaces engaged by the levers to propel the bars horizontally, a series of pivoted stop arms within the printing wheel, and means operated by the sliding bars for preventing all but one of the stop arms from engaging the printing wheel, the printing wheel having a single internal stop engaged by the stop arms.

11. A typing mechanism, comprising a printing wheel, a motor driven shaft for turning the printing wheel, a series of control rings having internal notches disposed in concentric relation to the printing wheel, said printing wheel having an internal stop, a series of pivoted arms mounted within the rings and the wheel to engage the stop, the rings having notches forming code keys for limiting the movement of the pivoted arms, a spring for moving each arm outwardly, a cam operated ring for moving the arms inwardly, code controlling bars having inclined surfaces and having driving connection with the notched rings, and manual character selecting levers mounted to engage the inclined surfaces of the bars.

12. A typing mechanism, comprising a printing wheel, a motor driven shaft having driving engagement with the wheel, a series of horizontal bars having code inclined surfaces, manual character selecting levers pivoted to engage the inclined surfaces of the horizontal bars, the printing wheel having a stop, a series of arms pivoted to engage the stop, a motor driven cam shaft for releasing all of the arms, and movement controlling code rings operated by the horizontal bars to control the engagement of said arms with said stop and thereby govern the movement of the printing wheel, whereby only the character selected will be moved to printing position.

ADOLPH J. WOHLGEMUTH.

References Cited in the file of this patent

UNITED STATES PATENTS

| Number | Name | Date |
| --- | --- | --- |
| 819,998 | Jarvis | May 8, 1906 |
| 1,534,164 | Creed | Apr. 21, 1925 |
| 2,290,385 | Rugh | July 21, 1942 |
| 2,375,541 | Dirkes et al. | May 8, 1945 |

FOREIGN PATENTS

| Number | Country | Date |
| --- | --- | --- |
| 317,655 | Italy | of 1934 |